United States Patent
Amerga et al.

(10) Patent No.: US 9,913,311 B1
(45) Date of Patent: Mar. 6, 2018

(54) METHODS FOR TXPOOL SELECTION FOR LTE-D CODE TRANSMISSION

(71) Applicant: QUALCOMM Incorporated, San Diego, CA (US)

(72) Inventors: Daniel Amerga, San Diego, CA (US); Arvind Santhanam, San Diego, CA (US); Ashish Iyer, San Diego, CA (US); Shailesh Maheshwari, San Diego, CA (US); Srinivasan Rajagopalan, San Diego, CA (US); Srinivasan Balasubramanian, San Diego, CA (US); Scott Hoover, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/244,386

(22) Filed: Aug. 23, 2016

(51) Int. Cl.
*H04W 76/02* (2009.01)
*H04W 8/00* (2009.01)
(Continued)

(52) U.S. Cl.
CPC ......... *H04W 76/023* (2013.01); *H04W 8/005* (2013.01); *H04W 28/22* (2013.01); *H04W 72/0486* (2013.01)

(58) Field of Classification Search
CPC ........... H04W 76/023; H04W 72/0486; H04W 8/005; H04W 28/22
(Continued)

(56) References Cited

U.S. PATENT DOCUMENTS 9,326,122 B2    4/2016   Xiong et al.
2006/0198346 A1*   9/2006   Liu ..................... H04W 40/24
                                                                            370/338
(Continued)

FOREIGN PATENT DOCUMENTS

KR      20160016489 A    2/2016
WO      2015115872 A1    8/2015
(Continued)

OTHER PUBLICATIONS

Tehrani M.N., et al., "Device-to-Device Communication in 5G Cellular Networks: Challenges, Solutions, and Future Directions", IEEE, 5G Wireless Communications Systems, Prospects and Challenges, IEEE Communications Magazine, May 2014, pp. 86-92.
(Continued)

*Primary Examiner* — Inder Mehra
(74) *Attorney, Agent, or Firm* — Arent Fox, LLP

(57) ABSTRACT

In device-to-device (D2D) communication in a licensed spectrum, selection of a transmit pool and distribution of codes to be transmitted to the transmit pools for more efficient transmission is desired, for a given period. The apparatus may a user equipment (UE) for D2D communication in a licensed spectrum. The UE sets a discovery epoch to a shortest discovery period among discovery periods of a plurality of transmit resource pools, each transmit resource pool of the plurality of transmit resource pools associated with a respective frequency. The UE estimates a channel utilization of each transmit resource pool of the plurality of transmit resource pools based on one or more previous transmissions on each transmit resource pool of the plurality of transmit resource pools. The UE selects a transmit resource pool among the plurality of transmit resource pools for a D2D transmission within the discovery epoch based on the estimated channel utilizations.

28 Claims, 13 Drawing Sheets

(51) Int. Cl.
*H04W 28/22* (2009.01)
*H04W 72/04* (2009.01)

(58) Field of Classification Search
USPC .................. 455/509, 41.3; 370/433, 468
See application file for complete search history.

(56) References Cited

U.S. PATENT DOCUMENTS

| | | |
|---|---|---|
| 2013/0109301 A1 | 5/2013 | Hakola et al. |
| 2015/0215903 A1 | 7/2015 | Zhao et al. |
| 2015/0327180 A1* | 11/2015 | Ryu .................. H04L 1/00 370/329 |
| 2016/0157080 A1 | 6/2016 | Agiwal et al. |
| 2017/0013598 A1 | 1/2017 | Jung et al. |
| 2017/0188391 A1* | 6/2017 | Rajagopal ......... H04W 74/0816 |
| 2017/0230918 A1 | 8/2017 | Ryu et al. |

FOREIGN PATENT DOCUMENTS

| | | |
|---|---|---|
| WO | 2015178851 A1 | 11/2015 |
| WO | 2016048407 A1 | 3/2016 |
| WO | 2016093624 A2 | 6/2016 |

OTHER PUBLICATIONS

International Search Report and Written Opinion—PCT/US2017/040412—ISA/EPO—Oct. 18, 2017.

\* cited by examiner

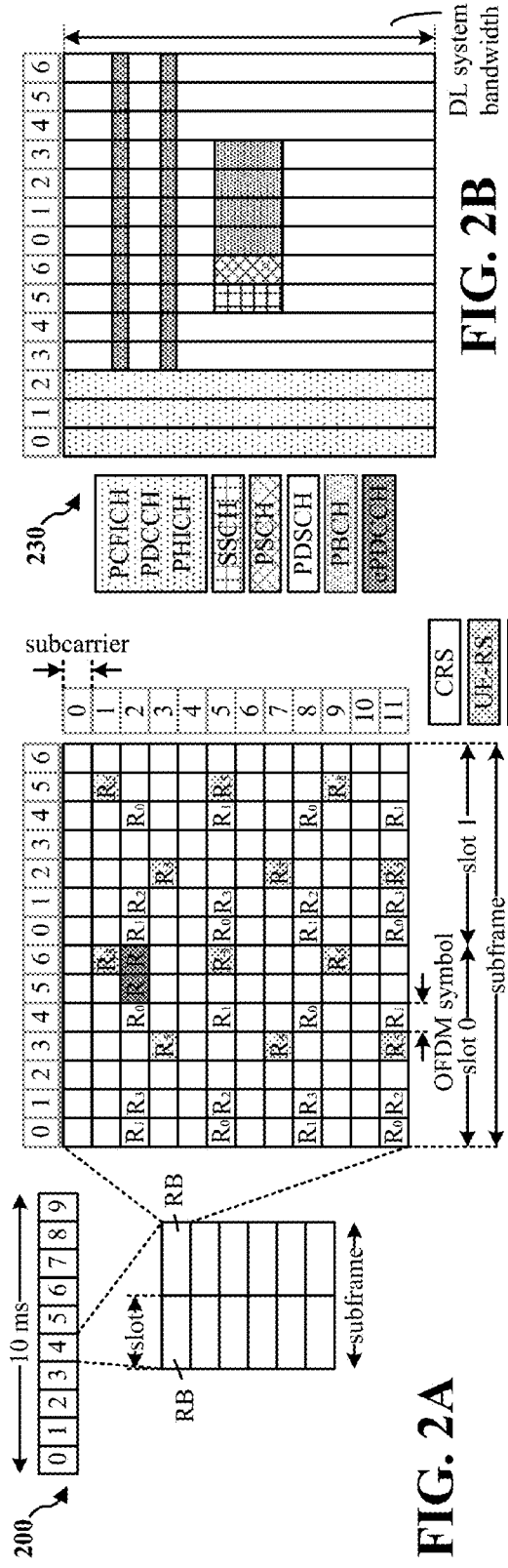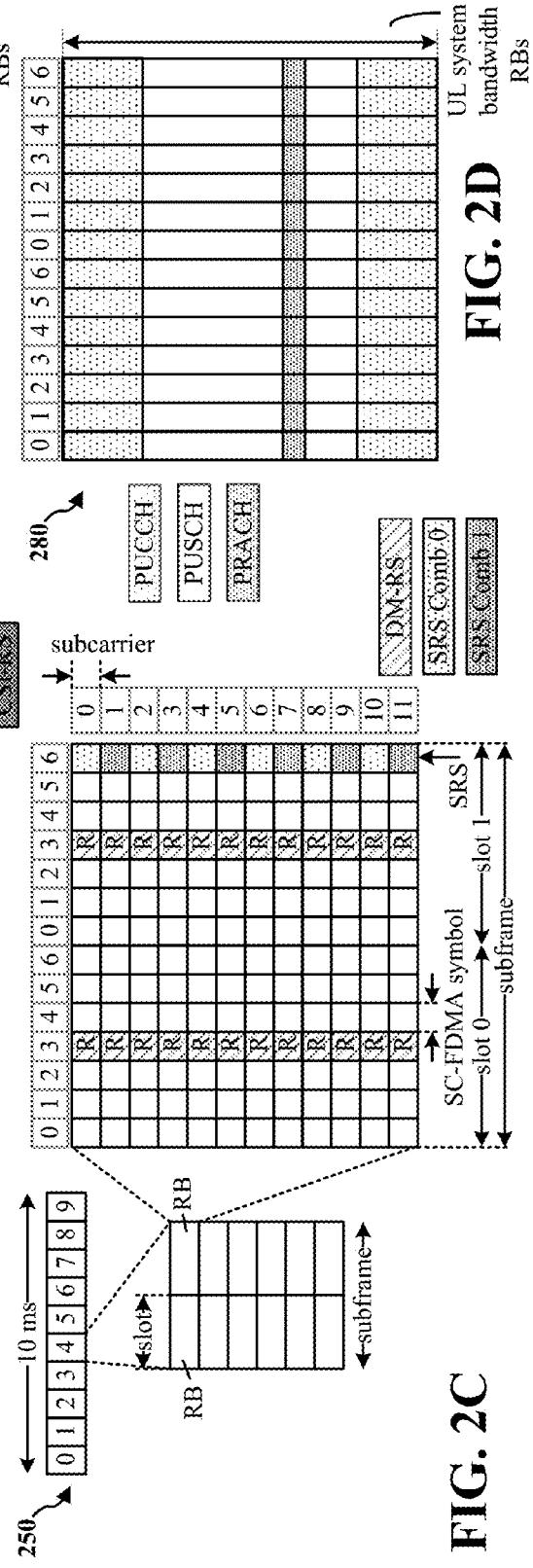

Device-to-Device Communications System

METHODS FOR TXPOOL SELECTION FOR LTE-D CODE TRANSMISSION

BACKGROUND

Field

The present disclosure relates generally to communication systems, and more particularly, to cellular-based device-to-device communication utilizing resource selection.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Device-to-device communication features may enable devices to directly communicate with each other. LTE may be utilized to perform device-to-device communication. Improvements have been made to device-to-device communication using LTE for efficient device-to-device communication among devices

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An LTE direct (LTE-D) is one way to perform device-to-device (D2D) communication in a licensed spectrum. The LTE-D device may be configured with multiple transmit pools that are resources for transmission (e.g., D2D transmission). Because there are multiple transmit pools, the UE may select a transmit pool of the multiple transmit pools for transmission. Therefore, selection of a transmit pool for more efficient transmission is desired, for a given transmission period. Further, efficient transmission of codes should also be developed, considering channel conditions of the multiple transmit pools.

In an aspect of the disclosure, a method, a computer-readable medium, and an apparatus are provided. The apparatus may be a user equipment (UE) for D2D communication in a licensed spectrum. The UE sets a discovery epoch to a shortest discovery period among discovery periods of a plurality of transmit resource pools, each transmit resource pool of the plurality of transmit resource pools associated with a respective frequency. The UE estimates a channel utilization of each transmit resource pool of the plurality of transmit resource pools based on one or more previous transmissions on each transmit resource pool of the plurality of transmit resource pools. The UE selects a transmit resource pool among the plurality of transmit resource pools for a D2D transmission within the discovery epoch based on the estimated channel utilizations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
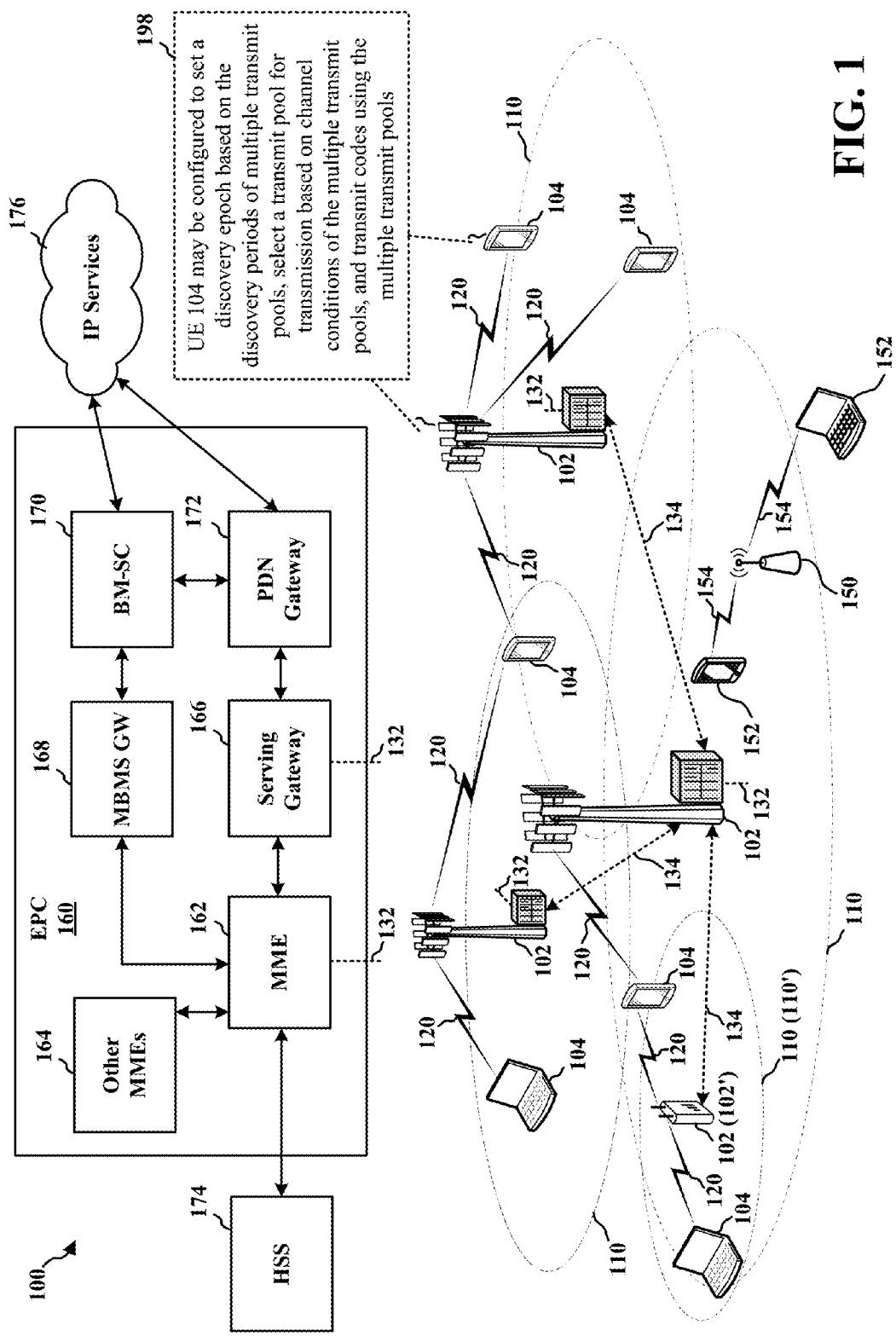
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to set a discovery epoch based on the discovery periods of multiple transmit pools, select a transmit pool for transmission based on channel conditions of the multiple transmit pools, and transmit codes using the multiple transmit pools (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
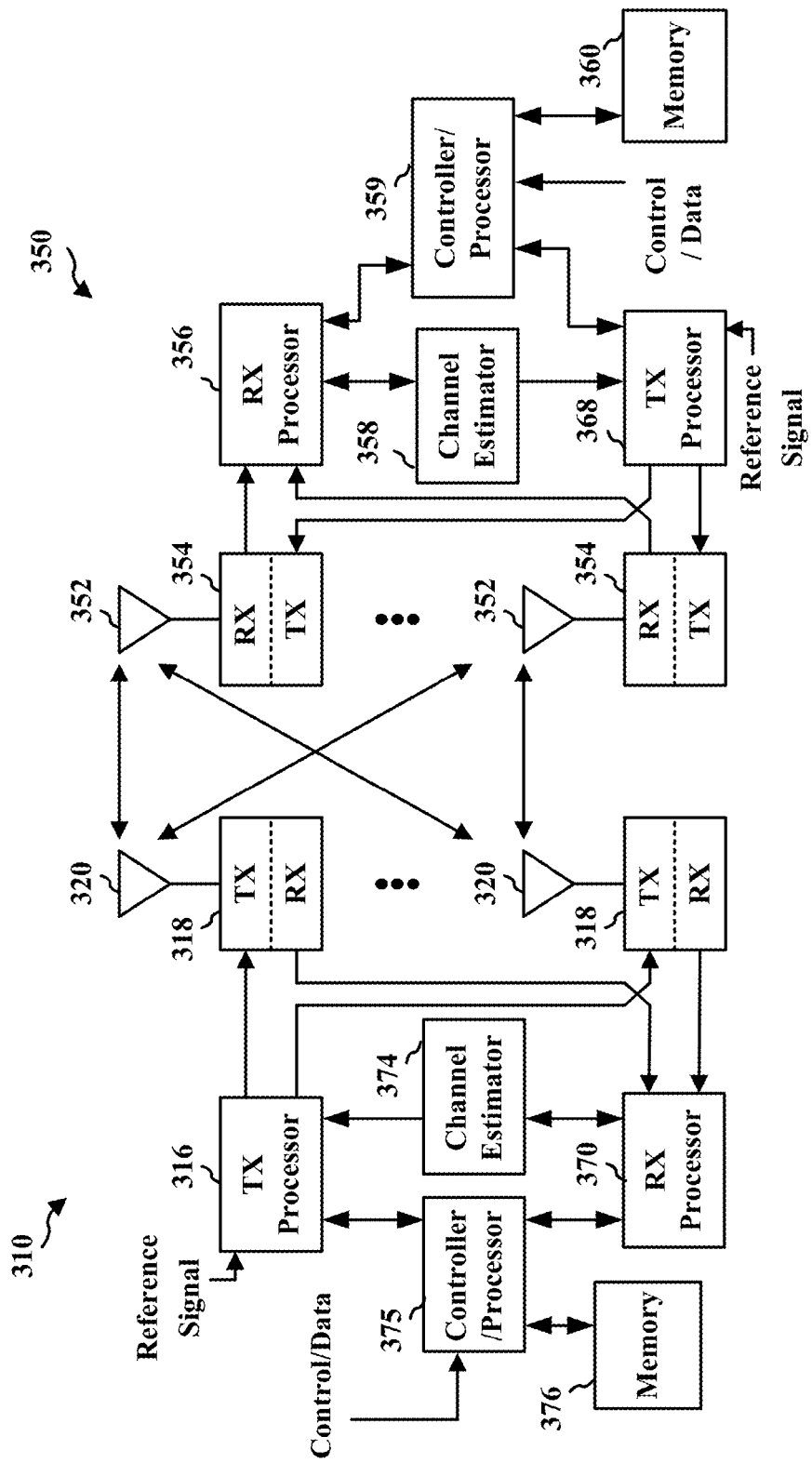
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
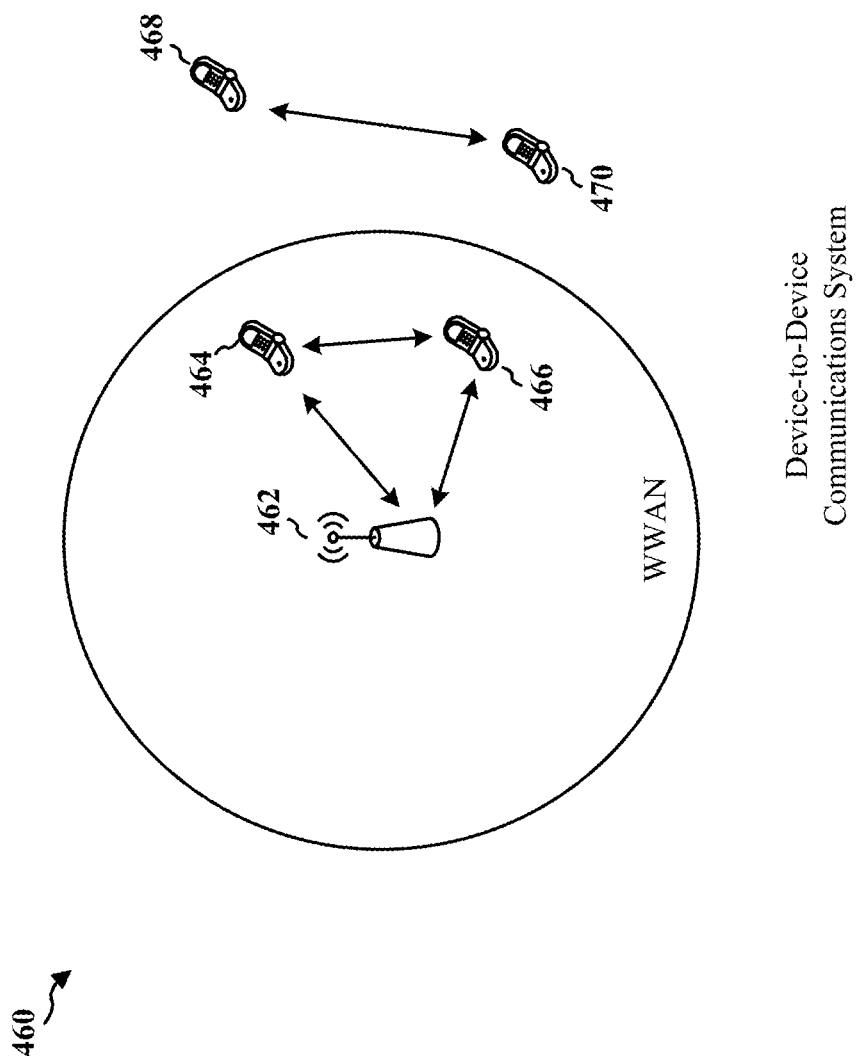
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

D2D communication over a licensed spectrum has been under development to provide an effective and direct communication approach between devices. One example of a D2D communication over a licensed spectrum includes communication using LTE Direct (LTE-D). LTE-D has been developed to enable devices to perform D2D communication for communicating messages during an allocated resource slot and a bandwidth. Receiving messages using LTE-D may enable a wireless device (e.g., a UE) to discover nearby devices, and may enable the wireless device to send location information of the wireless device and to receive location information of nearby devices. During the D2D communication using LTE-D, a user device may broadcast messages (e.g., expressions) to nearby devices within proximity of the user device, and thus a nearby device may receive the broadcasted message. For example, in LTE-D, a discovery slot (e.g., a 64 millisecond time slot) in a resource may be allocated for a device to perform a D2D communication after a certain period of time corresponding to a large portion of the resource (e.g., every 10 seconds). LTE-D may provide an autonomous discovery that is continuous and passive. During the discovery slot, a device may discover a peer device by receiving a discovery message broadcasted from the peer device. During the discovery slot, a device may obtain information from a peer device via LTE-D, where the information may include location information and user/device information of the peer device. Hence, LTE-D provides a simple and efficient approach for a device to discover peer devices and exchange information (e.g., device locations) with the peer devices. Further, numerous devices (e.g., more than 1000 devices) may be in communication via LTE-D over a long distance range (e.g., more than 100 meters).

An LTE-D expression transmitted by a device may include a 184 bit application code carried in a 256 bit MAC PDU. The application code may include 160 bits which may be mapped to a proximity-service application identifier (PAI, e.g., a structured string). A device using LTE-D may communicate with an LTE-D server to determine the mapping between the application code and a structured string (e.g., a PAI). Metadata associated with the application code may provide additional context. Specific bit codes (e.g., application code) in the LTE-D expression may be mapped to a specific filter. A device receiving an LTE-D expression may have a filter that allows an LTE-D expression with bit codes that match the filter and excludes other LTE-D expressions with bit codes that do not match the filter. Thus, for example, transmitting LTE-D devices may broadcast different types of expressions with different bit codes, and receiving LTE-D devices may receive one or more expressions that match filters in the respective LTE-D devices.

A device may transmit an LTE-D discovery message (e.g., an expression) using certain RBs that are allocated to D2D discovery. In general, D2D discovery may utilize a small fraction of the UL resources. For example, in a case where 100 RBs exist in a 20 MHz frequency band and 32 subframes exist every 10.24 seconds, 88 RBs per subframe may be available for D2D discovery communication. In such a case, 88% of the resources is considered available for D2D discovery communication. A resource for D2D may include 2 RBs in 1 subframe. In the example where 32 subframes are available and 88 RBs per subframe are available, 1408 D2D discovery resources are available.

Figure 5:
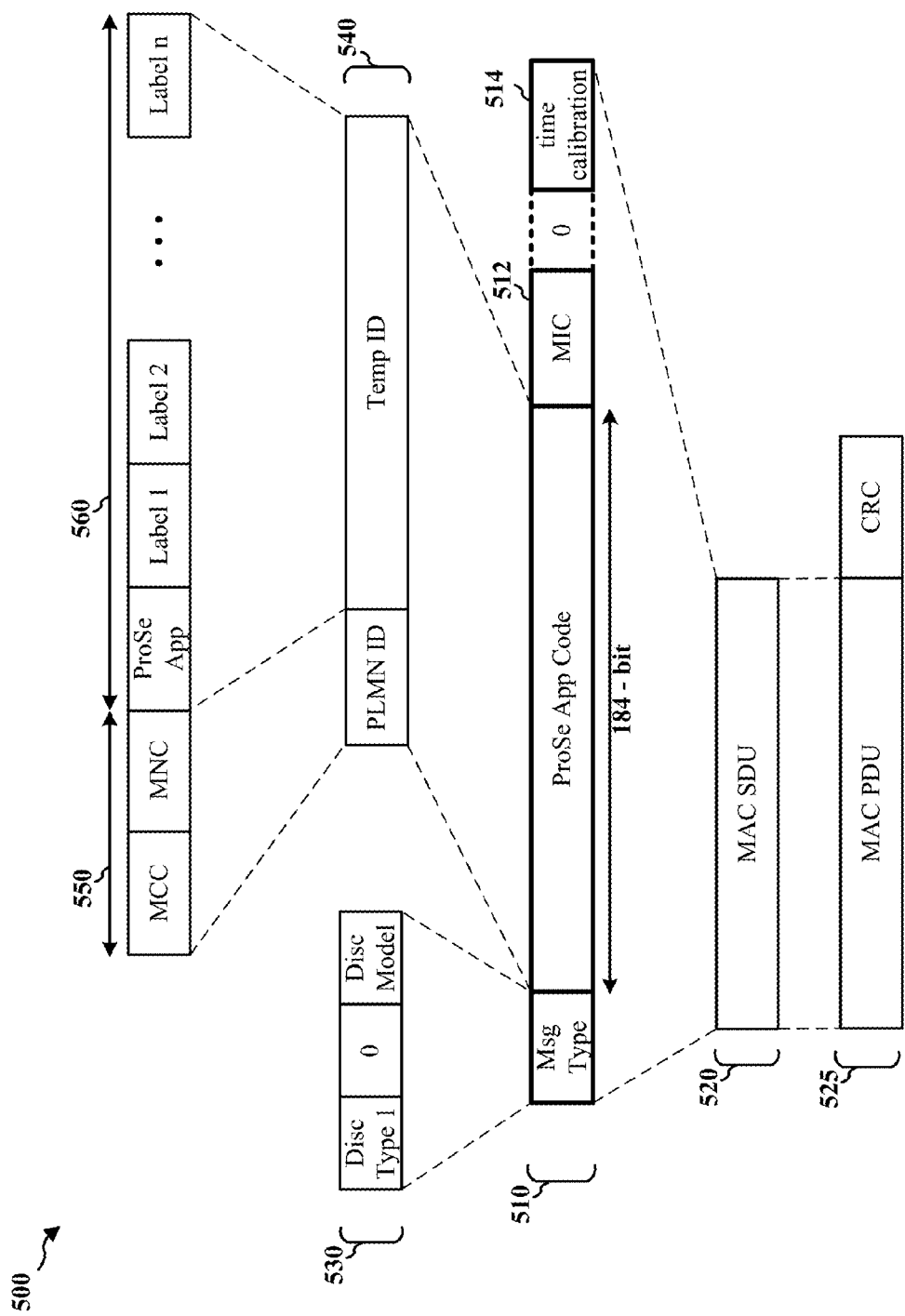
FIG. 5 is an example diagram illustrating a structure of a discovery message.

FIG. 5 is an example diagram 500 illustrating a structure of a discovery message. A discovery message (e.g., an expression) 510 may be included in a MAC SDU 520, e.g., of size 232 bits, that is encapsulated in a MAC PDU 525, e.g., of size 232 bits, with a cyclic redundancy check (CRC), e.g., of size 24 bits. The discovery message 510 may include a message type field 530 and a proximity service (ProSe) application code field 540. The ProSe application code field 540 may be a 184 bit string that includes a 24 bit PLMN ID 550 and a 160 bit temporary identifier (ID) 560. The PLMN ID 550 includes a mobile country code (MCC), and a mobile network code (MNC). The PLMN ID 550 may depend on a cell where the UE is camped. The temporary ID 560 may vary depending on an application. The temporary ID 560 may be a ProSe application ID name that includes information about a ProSe application and various hierarchical levels of a category. In the example illustrated in FIG. 5, a ProSe Application ID name in the temporary ID 560 is displayed as a string of labels where the labels represent hierarchical levels. For example, level 0 may include a broadest category, level 1 may include a sub-category of the broadest category of level 0, and level 2 may include a sub-category of the sub-category of level 1, and so forth. In one example, different levels of a category for a business may be a broad-level business category (Level 0)/a business sub-category (Level 1)/a business name (Level 2)/a business location (Level 3)/a shop ID (Level 4). In one example, the ProSe application ID name may be in a form of mcc310.mnc150.ProSeApp.FoodAndDining.shops.coffee. starbucks.NorthAmerica. California.SanDiego.zip92101. shop.code21212. Because information for mapping a PAI to the application code is in the LTE-D server, the UE that wants to transmit the code over LTE-D obtains the application code from the server for a given PAI. The UE that wants to receive an application code over LTE-D obtains "discovery filters" from the server for a given PAI. A discovery filter can match the entire 184 bits or a portion of the application code defined by a mask (depending on the PAI). The discovery message 510 may further includes a message integrity check (MIC) field 512 and a time calibration field 514.

Figure 6:
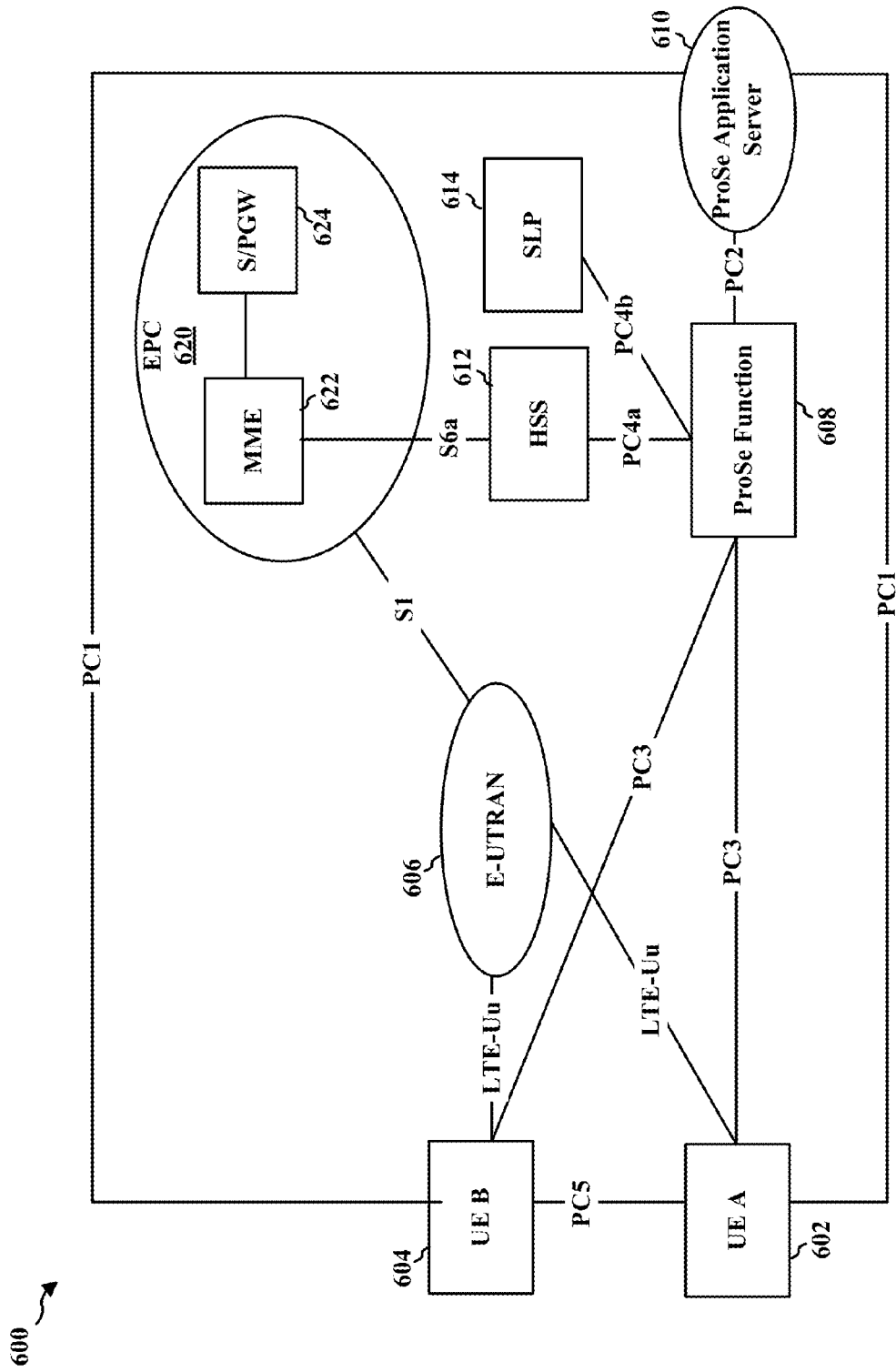
FIG. 6 is a diagram illustrating an example of a wireless communications system involving device-to-device communication between two user equipments.

FIG. 6 is a diagram 600 illustrating an example of a wireless communications system involving device-to-device communication between two user equipments. The UE A 602 and the UE B 604 may communicate with each other via a PC5 connection for D2D communication. Thus, for example, the UE B 604 may discover the UE A 602 using a discovery message communicated from the UE A 602 via the PC5 connection over LTE-D. The PC5 connection provides a physical layer connection through which a MAC PDU may be communicated (e.g., without an IP header). The UE A 602 and the UE B 604 may communicate with the E-UTRAN 606 via respective LTE-Uu interfaces. UE A 602 and the UE B 604 may be connected to a ProSe function 608 via respective PC3 connections, and may be connected to the ProSe application server 610 via respective PC1 connections. The PC3 connections may be a connections over a dedicated access point name (APN) or a default APN, and may be over WLAN, LTE, general packet radio service (GPRS), UMTS, high rate packet data (HRPD), etc. The protocol used for the PC3 connections may be an extensible markup language (XML) over HTTP (on top of transport layer security pre-shared key ciphersuites (TLS-PSK)). The ProSe function 608 and the ProSe application server 610 may be connected via a PC2 connection. The UE A 602 and the UE B 604 receive authorization to receive and/or send certain codes from the ProSe function 608 over the PC3 connections, where the authorization authorizes the UE A and the UE B to communicate with each other via D2D communication (e.g., over LTE-D). Once the UE A 602 and the UE B 604 receives the authorization for the particular codes from the ProSe function 708, the UE A 602 and the UE B 604 may begin communicating the particular codes over D2D communication via the PC5 connection. The ProSe function 608 may be connected to an HSS 612 via a PC4a connection and may be connected to an secure user plane location (SUPL) location platform (SLP) 614 via a PC4b connection. The HSS 612 may be connected to the MME 622 of the EPC 620 via an S6a connection, and the MME 622 may be connected to a serving gate way and a PDN gate way 624. The EPC 620 may be connected to the E-UTRAN 606 via an S1 connection.

Figure 7A:
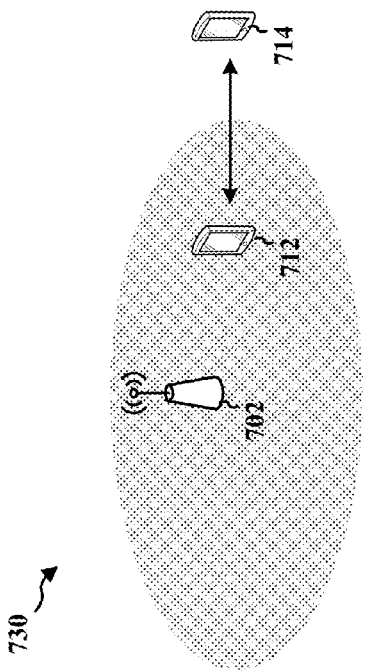
FIGS. 7A-7D are example diagrams illustrating various discovery deployment scenarios for device-to-device communication.
Figure 7B:
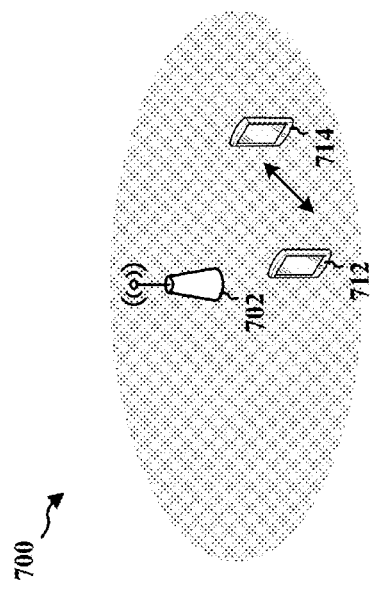
Figure 7C:
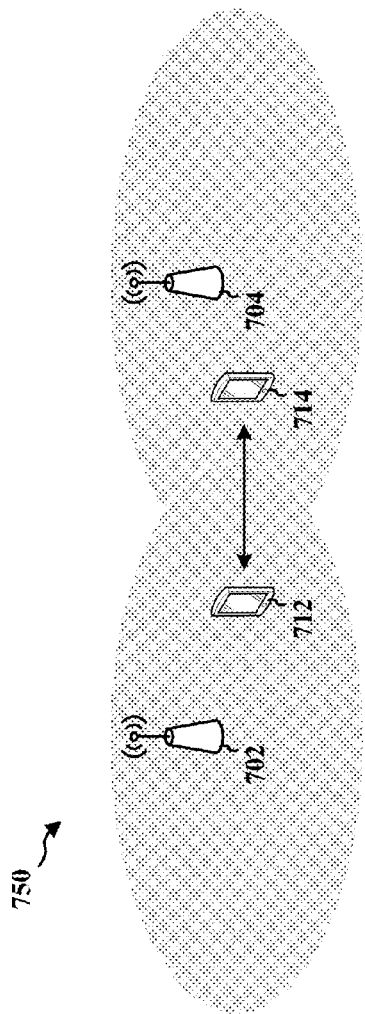
Figure 7D:
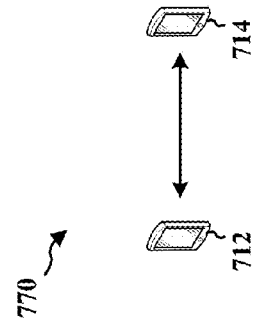

FIGS. 7A-7D are example diagrams illustrating various discovery deployment scenarios for device-to-device communication. FIG. 7A is an example diagram 700 illustrating a first case where two user equipments are within coverage of a single cell. In the example diagram 700, a first UE 712 and a second UE 714 within the same cell served by a base station 702 may perform D2D communication with each other (via a PC5 connection). FIG. 7B is an example diagram 730 illustrating a second case where one user equipment is within coverage of a cell and another user equipment is out of coverage of the cell. In the example diagram 730, a first UE 712 is within a cell served by a base station 702 and a second UE 714 is out of coverage. The first UE 712 in the first cell and the second UE 714 that is out of coverage may perform D2D communication with each other (via a PC5 connection). FIG. 7C is an example diagram 750 illustrating a third case where two user equipments are within coverage of multiple cells. In the example diagram 750, a first UE 712 is within a first cell served by a base station 702 and a second UE 714 is within a second cell served by another base station 704. The first UE 712 in the first cell and the second UE 714 in the second cell may perform D2D communication with each other (via a PC5 connection). FIG. 7D is an example diagram 770 illustrating a fourth case where user equipments are out of coverage. Although both the first UE 712 and the second UE 714 are out of coverage in the example diagram 770, the first UE 712 and the second UE 714 may perform D2D communication with each other (via a PC5 connection).

An LTE-D device (e.g., a UE) may be configured with multiple resource pools including transmit resource pools (tx pools) and receive resource pools (rx pools). In one example, up to 4 tx pools may be configured via discTxPoolCommon included in SIB19, where discTxPoolCommon is an information element (IE) indicating resources that the UE should use for transmission. In one example, discTxPoolDedicated included in sl-DiscConfig may include a subset of the set of tx pools defined in discTxPoolCommon included in SIB19. Each tx pool corresponds with a particular frequency. The configuration with multiple resource pools may cause contentions in the way the resource pools are selected and how the resource pools overlap. In an aspect, each code in a given discovery period may map to one tx pool. Each tx pool may be associated with resources for transmission of LTE-D data. Different tx pools may have different periodicities. Some tx pools may overlap, at least in part, with each other in time. Thus, selection of a tx pool for more efficient transmission is desired. In particular, a tx pool may be selected such that the selected tx pool provides a high probability of successful transmission via the selected tx pool to be received by other devices. In an aspect, contention resolution for tx pools may be provided.

The UE may be allowed to use up to 4 tx pools (e.g., as specified in maxSL-TxPool-r12 included in SIB19/dedicated signaling). Each tx pool may have subframes available to be used for transmission. In one example, the network (e.g., eNB) may either configure all of the tx pools with a specific RSRP range condition or may not configure any of the tx pools with an RSRP range condition. For each code, the UE may randomly select a tx pool out of available tx pools to perform transmission. In an aspect, upon selection of a tx pool, eligibility of scheduling a code transmission in the tx pool is subject to additional constraints such as RSRP range conditions, transmission probability (e.g., tx-probability), presence of another code for transmission in the subframe, etc. For example, for each code, the UE may determine LTE-D transmission eligibility on a corresponding tx pool if RSRP range conditions are satisfied (e.g., where each tx pool may have different RSRP range conditions). In an aspect, for each code, the UE may determine LTE-D transmission eligibility on a corresponding tx pool, e.g., by determining if a transmission probability check on a corresponding tx pool passes (e.g. exceeds a probability threshold). In an aspect, the UE may determine LTE-D transmission eligibility on a tx pool subframe by determining whether or not another code is scheduled for transmission on the tx pool subframe.

In an aspect, tx pool selection may be performed based on the following approach. Different tx pools may have different periodicities. When the UE randomly selects an eligible tx pool for LTE-D transmission, the UE may select a tx pool within time windows defined by a discovery epoch (e.g., T_txpool_epoch). In an aspect, the UE may set the discovery epoch to the shortest discovery period of all discovery periods of all available tx pools. In an aspect, if the UE determines that a less dense channel utilization is desired (e.g., based on sensing the channel utilization), the UE may select a more relaxed discovery period from the discovery periods of the available tx pools, where the channel utilization may be a percentage of resources that is used for transmission. The more relaxed discovery period may be a discovery period that is greater than the shortest discovery period of the discovery periods of available tx pools. Utilizing a more relaxed (e.g., longer) discovery period may result in less frequent LTE-D code transmissions, which may reduce overall interference during transmission using LTE-D subframes. For example, During each discovery period defined by the discovery epoch, for each code, the UE selects a random tx pool from available tx pools for transmission of a code.

In an aspect, the UE may adjust the discovery epoch based on channel conditions. The discovery epoch may be adjusted based on the channel conditions after initially selecting the discovery epoch as a shortest discovery period of discovery periods of the available tx pools. By adjusting the discovery epoch, a transmit rate may be adjusted. For example, the transmit rate may be increased by decreasing the discovery epoch, and the transmit rate may be decreased by increasing the discovery epoch. Because a transmission is performed during each discovery epoch, the transmission is performed more frequently with a shorter discovery epoch, and the transmission is performed less frequently with a longer discovery epoch. The channel conditions may be channel utilizations that may be determined by the UE. In an aspect, if the UE determines that the overall channel utilization is high, the UE may lower the UE's transmission rate (e.g., LTE-D transmission rate) to reduce overall interference in the system. The UE's transmission rate may be lowered by selecting a longer discovery period as a discovery epoch, where the discovery period selected is one of the discovery periods of the available tx pools. The overall channel utilization may be determined based on tx pool channel utilizations of tx pools (e.g., an average of tx pool channel utilizations of tx pools). The UE may determine a tx pool channel utilization of each of tx pools based on a CRC failure rate (e.g., based on an error rate during a CRC) and/or based on an energy level of a channel for the tx pool. The energy level may be determined based on a received signal strength indicator (RSSI). The UE may determine that a tx pool channel utilization is high based on a high CRC failure rate and/or a high energy level (e.g., exceeding certain thresholds). For example, the overall channel utilization may be high if the individual tx pool channel utilization of each tx pool is high. In an aspect, if the UE determines that the overall channel utilization is low, the UE may set the discovery epoch to the shortest discovery period of the discovery periods of the available tx pools, in order to allow the UE to transmit more codes. The UE may determine that a tx pool channel utilization is low based on a low CRC failure rate and/or a low energy level (e.g., CRC failure rate below a first threshold and/or the energy level below a second threshold). For example, the overall channel utilization may be low if the individual tx pool channel utilization of each tx pool is low. Thus, by monitoring all available tx pools, the UE may determine a tx pool channel utilization for each of the tx pools.

Therefore, the UE may determine the transmission rate based on the channel utilizations by setting a discovery epoch based on the channel utilizations in order to more reliably transmit codes. The reliable transmission generally provides a high probability of a receiving device successfully decoding the codes transmitted by the UE. In an aspect, the UE may set the discovery epoch to a discovery period of a tx pool, such that code collision/interference may be reduced or avoided (e.g., to achieve a low CRC failure rate).

After selecting or adjusting a discovery epoch, during each discovery period defined by the discovery epoch, the UE may select a tx pool out of available tx pools within the discovery period for transmission, where the selected tx pool allows high transmission efficiency. In an aspect, the UE may select a tx pool based on the channel utilizations of the available tx pools. The channel utilizations may be determined based on previous transmissions. For example, the UE may select a tx pool that has the highest CRC passing rate (e.g., lowest CRC failure rate) and/or the highest energy.

In an aspect, a tx pool selection may be a function of a previous tx pool channel utilization of the available tx pools and a previous tx pool selection. For example, a current tx pool selection C(n+1) may be determined based on the following function (Function (1)):

$$C(n+1)=F(((X_1(n),X_2(n),\ldots,X_k(n)).C(n)), \quad (1)$$

where $X_1(n)$ through $X_k(n)$ are previous tx pool channel utilizations for tx pool 1 through tx pool k, where k is a positive integer, n represents a time iteration, and C(n) is a previous tx pool selection.

Figure 8:
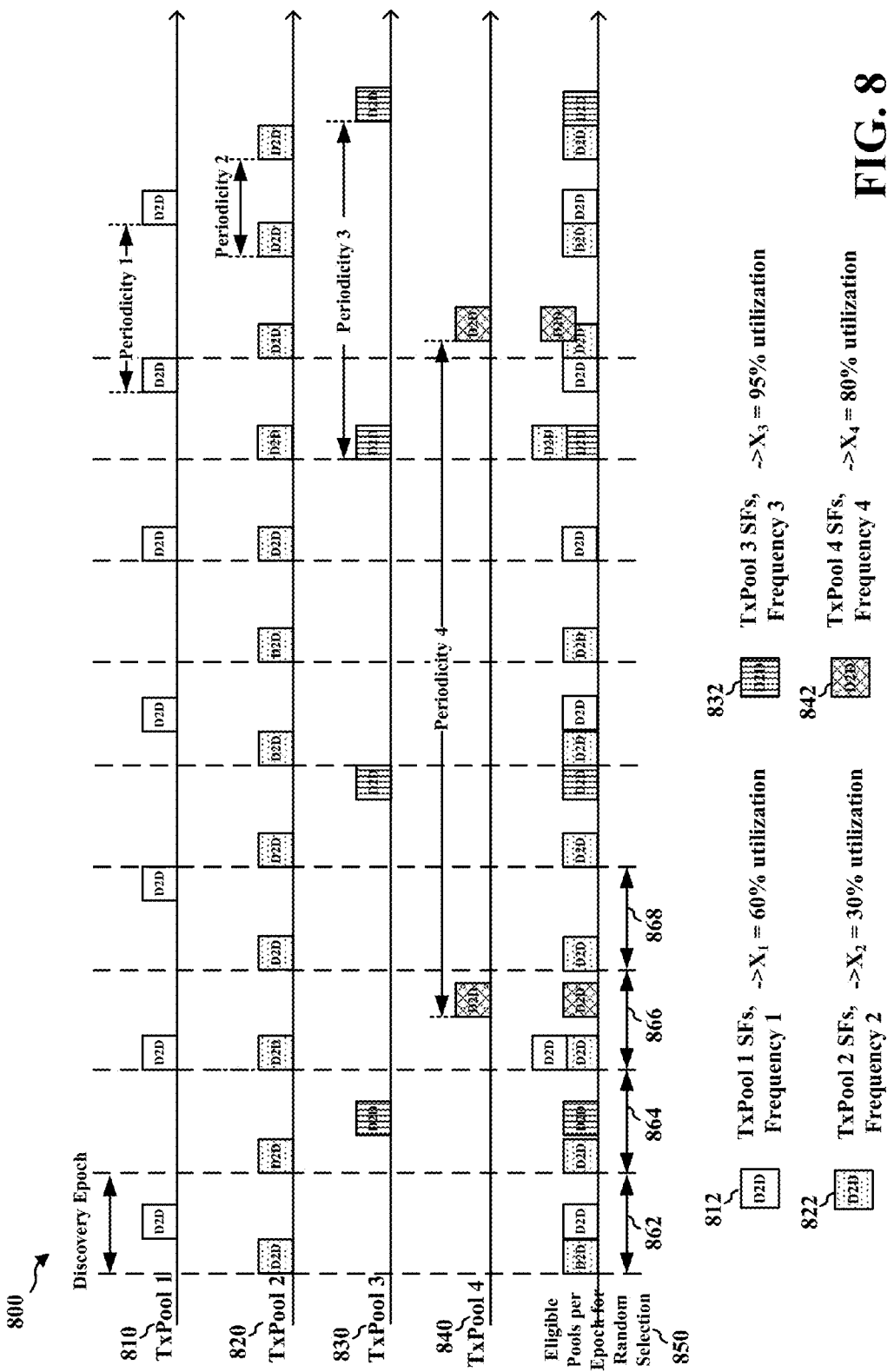
FIG. 8 is an example diagram illustrating a transmit pool selection process.

FIG. 8 is an example diagram 800 illustrating a tx pool selection process. In the example diagram 800 of FIG. 8, there are four tx pools, TxPool 1, TxPool 2, TxPool 3, and TxPool 4. Each tx pool has subframes that are spaced apart by the periodicitiy of the particular tx pool. The TxPool 1 timeline 810 for TxPool 1 shows that TxPool 1 subframes 812 are spaced apart by Periodicity 1. The TxPool 2 timeline 820 for TxPool 2 shows that TxPool 2 subframes 822 are spaced apart by Periodicity 2. The TxPool 3 timeline 830 for TxPool 3 shows that TxPool 1 subframes 832 are spaced apart by Periodicity 3. The TxPool 4 timeline 840 for TxPool 4 shows that TxPool 4 subframes 842 are spaced apart by Periodicity 4. Because Periodicity 2 is the shortest discovery period out of Periodicity 1, Periodicity 2, Periodicity 3, and Periodicity 4, the UE may set a discovery epoch to be Periodicity 2.

In an aspect, during each discovery period defined by the discovery epoch, for each code, the UE may select a random tx pool for transmission out of available tx pools. Thus, during the first discovery epoch 862, the UE may randomly select a tx pool out of a TxPool 1 subframe and a TxPool 2 subframe. During the second discovery epoch 864, the UE may randomly select a tx pool out of a TxPool 2 subframe and a TxPool 3 subframe. During the third discovery epoch 866, the UE may randomly select a tx pool out of a TxPool 1 subframe, a TxPool 2 subframe, and a TxPool 4 subframe. During the fourth discovery epoch 868, the UE may select a TxPool 2 subframe as a tx pool because the TxPool 2 subframe is the only available tx pool subframe in the fourth discovery epoch 868.

In the example diagram 800 of FIG. 8, the tx pool channel utilization X1 for TxPool 1 is 60%, the tx pool channel utilization X2 for TxPool 2 is 30%, the tx pool channel utilization X3 for TxPool 3 is 95%, and the tx pool channel utilization X4 for TxPool 4 is 80%. Because TxPool 2 has the lowest tx pool channel utilization out of the available tx pools, the UE sets the discovery epoch to the Periodicity 2, without adjusting the discovery epoch to another periodicity.

In an aspect, instead of randomly selecting a subframe for transmission of a code, the UE may select a subframe for transmission based on the tx pool channel utilizations. Thus, during the first discovery epoch 862, the UE may select a TxPool 1 subframe because the tx pool channel utilization for TxPool 1 is the highest out of a TxPool 1 and a TxPool 2. During the second discovery epoch 864, the UE may select TxPool 3 subframe because the tx pool channel utilization for TxPool 3 is the highest out of a TxPool 2 and a TxPool 3. During the third discovery epoch 866, the UE may select TxPool 4 subframe because the tx pool channel utilization for TxPool 4 is the highest out of a TxPool 1 subframe, a TxPool 2 subframe, and a TxPool 4 subframe. During the fourth discovery epoch 868, the UE may select a TxPool 2 subframe because the TxPool 2 subframe is the only available tx pool subframe in the fourth discovery epoch 868.

A UE may have multiple applications where each application may have one or more codes. In an aspect, each application may have respective ProSe application codes (PACs). For example, the UE may support LTE-D monitoring and announcing capabilities for multiple applications and multiple PACs. The UE may have more applications executing than the UE can simultaneously handle. Thus, in one aspect transmission of codes may be scheduled in a round-robin manner, by transmitting one code after another sequentially. In another aspect, scheduling may be done by assigning a weight for each code based on priorities of the codes and/or priorities of the applications, such that the UE may schedule transmission of codes in a weighted round-robin manner. Priorities of codes and/or applications may be determined based various factors, such as a user input, application type (e.g., premium application v. non-premium application, foreground application v. non-foreground app), code type (e.g., premium code (paying) v. non-premium code), channel conditions (e.g., where channel conditions may impair one application more than other applications), etc. After assigning weights to the codes, the UE may map the codes to category queues based on the priorities associated with the codes and/or the applications, where different category queues have different queue priorities. If a category is not specified with a queue priority, a default queue priority may be assigned. A code that has not been previously transmitted may be assigned a higher priority than a code that has been previously transmitted. If a code is a new code in a category queue, the new code may be assigned a higher priority than a retransmitted code for the same category. Subsequently, the UE schedules code transmission (e.g., through the MAC layer) based on the queue priorities of the category queues. The UE may transmit the codes per discovery period (e.g., discover epoch), using a subframe of a tx pool selected based on channel utilizations. The UE may receive feedback on the channel conditions, to dynamically alter how the codes are assigned in each queue based on the feedback.

In an aspect, all codes should be transmitted at least once. Thus, an adoptive algorithm may be used that considers a number of codes to schedule in each attempt (e.g., each transmit period) based on the congestions and measurement. If there are multiple resources (e.g., multiple frequencies) to transmit codes, the UE may distribute code transmissions across the multiple resources.

Figure 9:
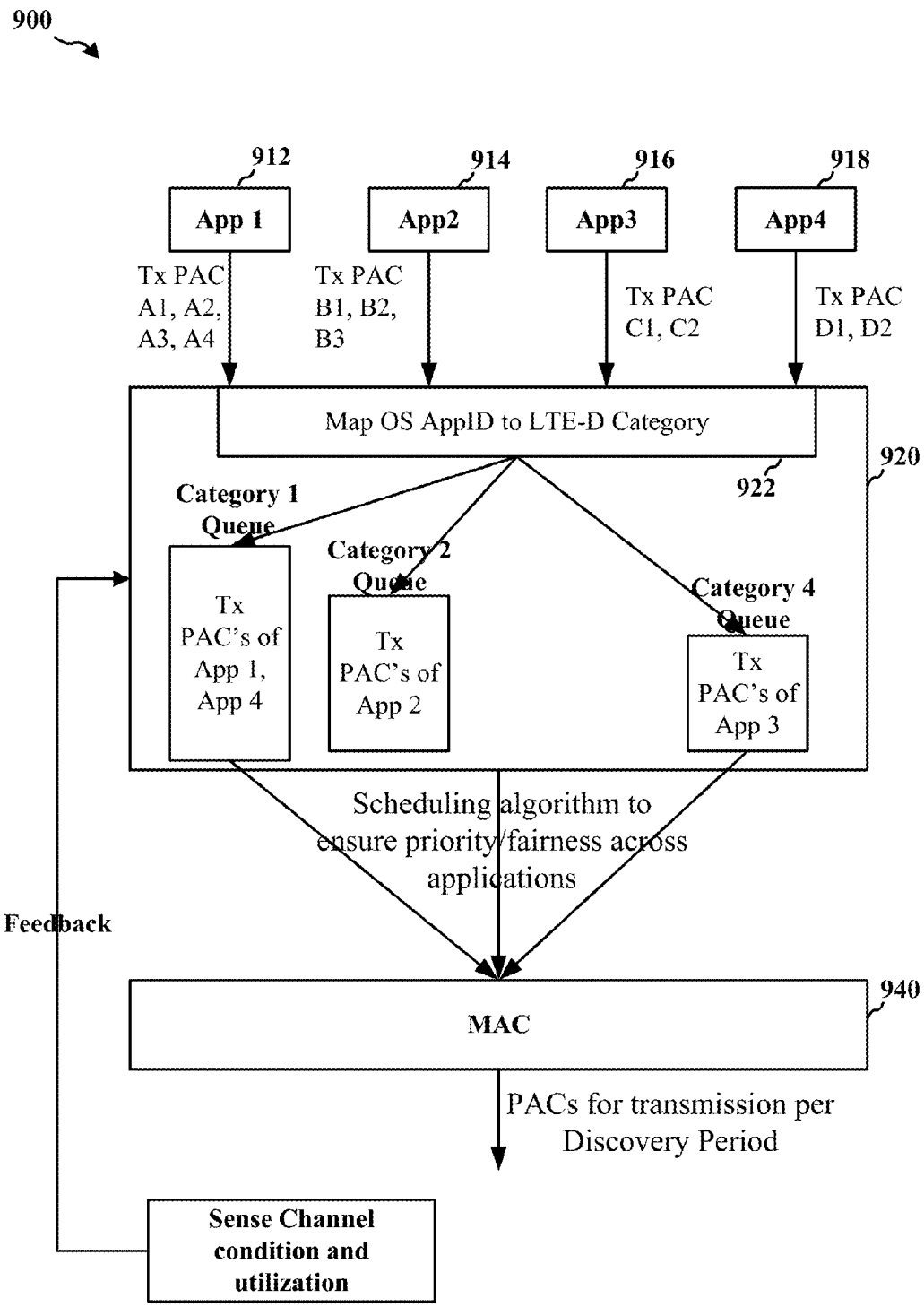
FIG. 9 is an example diagram illustrating scheduling of transmissions of codes by a user equipment.

FIG. 9 is an example diagram 900 illustrating scheduling of transmissions of codes by a user equipment. The UE may have several applications executing concurrently. The applications including a first application 912, a second application 914, a third application 916, and a fourth application 918, may provide codes (e.g., PACs) to an LTE-D client 920. The first application 912 provides PACs including A1, A2, A3, and A4. The second application 914 provides PACs including B1, B2, and B3. The third application 916 provides PACs including C1 and C2. The fourth application 918 provides PACs including D1 and D2. The UE may have several transmit queues, e.g., a Category 1 queue, a Category 2 queue, . . . a Category 4 queue.

The LTE-D client 920 may have a mapping component 922 to receive the PACs from the first, second, third, and fourth applications 912, 914, 916, and 918, and to map application identifiers (IDs) of the PACs to respective categories, based on the priorities. For example, the mapping component 922 may map the PACs of the first application 912 and the fourth application 918 to the Category 1 queue, may map the PACs of the second application 914 to the Category 2 queue, and may map the PACs of the third application 916 to the Category 4 queue. In the example diagram 900, no PACs are mapped to the Category 2 queue.

A scheduling algorithm in the LTE-D client 920 schedules transmissions of the PACs through a MAC layer 940 based on the categories which are based on the priorities of applications and/or codes. The MAC layer 940 may transmit the PACs during each discovery period. The UE may receive a feedback based on the channel conditions/channel utilization, such that the UE may dynamically adjust assignment of PACs are assigned in each category queue.

In an aspect, each category may have a minimum percentage of resource allocation guarantee. In an aspect, the UE may configure a minimum percentage of resource allocation for each category, and may assign a weight to each category based on the minimum percentage. In an aspect, the sum of all weights may equal to 1. If N codes are to be transmitted total, the UE may determine a maximum number of codes that can be transmitted in a discovery period. The maximum number of codes that can be transmitted in a discovery period may depend on various constraints such as tx-probability, an RSRP range, etc. If K codes may be scheduled to be transmitted in a discovery period, a number of codes scheduled for each category may be obtained by multiplying a weight corresponding to a category by K. Per each category, if a number of the codes to be transmitted is greater than a number of codes scheduled for the category (e.g., if N>K), then the UE may transmit up to the scheduled number of codes during a current discovery epoch and may transmit the remaining untransmitted codes (e.g., (N−K) codes) in a next discovery epoch. The following table shows an example code scheduling based on different weights for different categories.

TABLE 1

Example code scheduling for different categories.

| Categories | Minimum % for each category | Weight for each category | Number of Codes Scheduled for each Category |
|---|---|---|---|
| Category 1 | 50% | w1 = 0.5 | w1 * K (=0.5 * K) |
| Category 2 | 30% | w2 = 0.3 | w2 * K (=0.3 * K) |
| Category 3 | 20% | w3 = 0.2 | w3 * K (=0.2 * K) |
| Category 4 | 10% | w4 = 0.1 | w4 * K (=0.1 * K) |

For example, the UE may configure Category 1, Category 2, Category 3, and Category 4 respectively with 50%, 30%, 20%, and 10% of minimum resource allocation, which respectively correspond to w1=0.5, w2=0.3, w3=0.2, w4=0.1. In this example, because Category 1, Category 2, Category 3, and Category 4 are in an descending order of priority, where Category 1 has the highest priority and Category 4 has the lowest priority, the weights for Category 1, Category 2, Category 3, and Category 4 are in a descending order as well.

In an aspect, the UE may allocate excess resources (e.g., unused resources) of a category with a higher priority to a next category with a lower priority. In the above example, the number of codes scheduled for Category 1 is 0.5*K. If Category 1 has N codes and N is less than 0.5*K codes scheduled for Category 1, then the UE may allocate the remaining resources for (0.5*K−N) codes to the next category, Category 2. The UE may repeat a similar operation to allocate excess resources for all remaining categories to allocate excess resources to a next category. In an aspect, the actual number of codes that are transmitted (e.g., K_actual) may be different from the number of codes scheduled to be transmitted (e.g., K). The codes that are not transmitted should be transmitted in a subsequent attempt. Thus, after a transmission of the codes, the codes may be randomized before the next discovery epoch such that codes belonging to all categories would be transmitted at least once.

Figure 10:
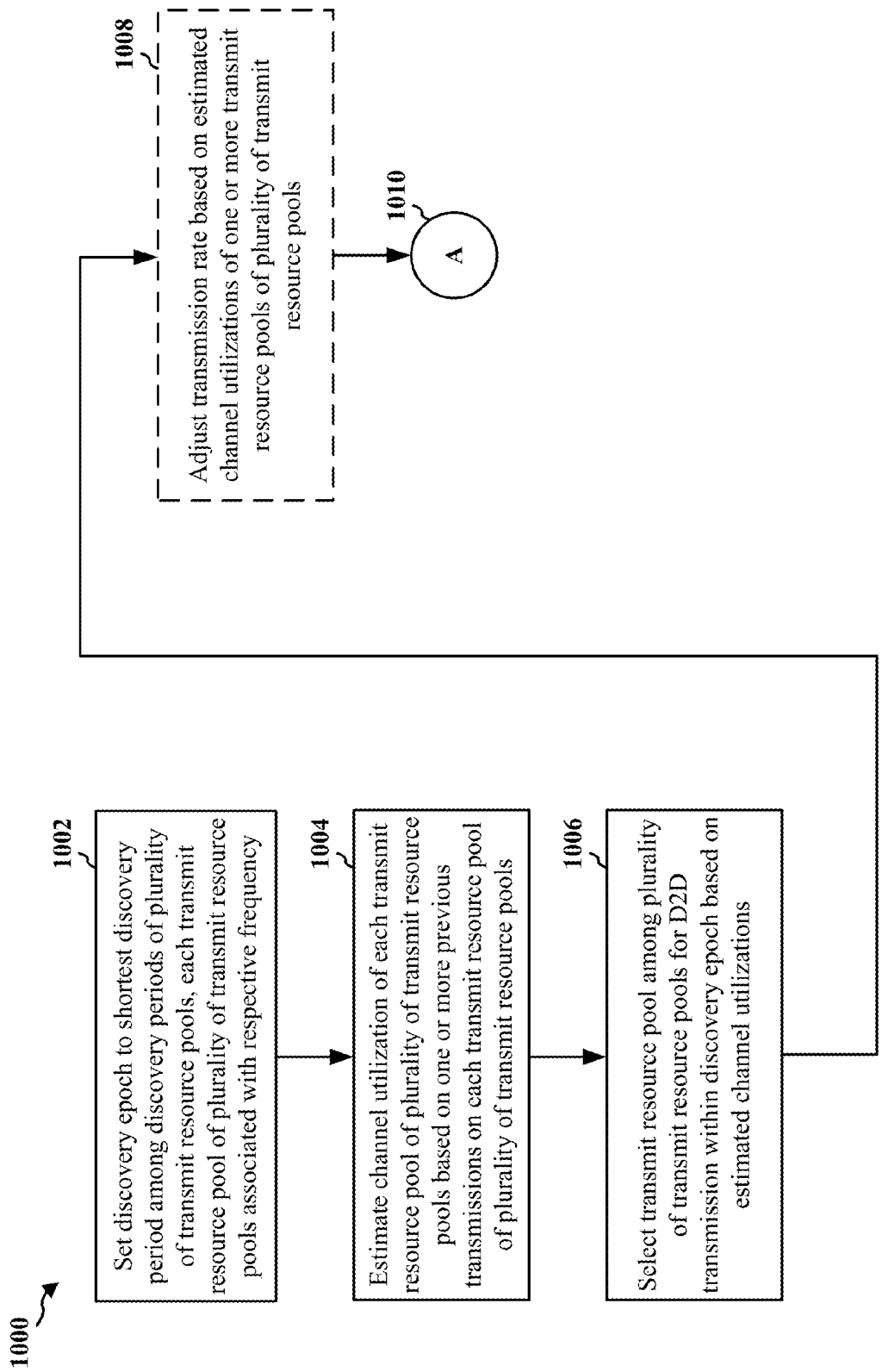
FIG. 10 is a flowchart of a method of device-to-device communication in a licensed spectrum.

FIG. 10 is a flowchart 1000 of a method of device-to-device communication in a licensed spectrum. The method may be performed by a UE (e.g., the UE 602, the apparatus 1202/1202'). At 1002, the UE sets a discovery epoch to a shortest discovery period among discovery periods of a plurality of transmit resource pools, each transmit resource pool of the plurality of transmit resource pools associated with a respective frequency. For example, as discussed supra, the UE may set the discovery epoch to the shortest discovery period of all discovery periods of all available tx pools, where each tx pool may correspond to its particular frequency. At 1004, the UE estimates a channel utilization of each transmit resource pool of the plurality of transmit resource pools based on one or more previous transmissions on each transmit resource pool of the plurality of transmit resource pools. At 1006, the UE selects a transmit resource pool among the plurality of transmit resource pools for a D2D transmission within the discovery epoch based on the estimated channel utilizations. For example, as discussed supra, after selecting or adjusting a discovery epoch, during each discovery period defined by the discovery epoch, the UE may select a tx pool out of available tx pools within the discovery period for transmission, where the selected tx pool allows high transmission efficiency, where the UE may select a tx pool based on the channel utilizations of the available tx pools. For example, as discussed supra, the channel utilizations may be determined based on previous transmissions.

At 1008, the UE may adjust a transmission rate based on the estimated channel utilizations of one or more transmit resource pools of the plurality of transmit resource pools. In an aspect, the UE may adjust the transmission rate by: decreasing the transmission rate if an overall channel utilization based on the estimated channel utilizations of the one or more of the plurality of transmit resource pools is greater than a channel utilization threshold, and increasing the transmission rate if an overall channel utilization based on the estimated channel utilizations of the one or more of the plurality of transmit resource pools is less than or equal to the channel utilization threshold. In an aspect, the transmission rate is adjusted by changing the discovery epoch to a new discovery epoch, the new discovery epoch being one of the discovery periods of the plurality of transmit resource pools that is different from the discovery epoch. In an aspect, the channel utilization of each transmit resource pool of the plurality of transmit resource pools is estimated based on at least one of a CRC or an energy level. For example, as discussed supra, by adjusting the discovery epoch, a transmit rate may be adjusted. For example, as discussed supra, the transmit rate may be increased by decreasing the discovery epoch, and the transmit rate may be decreased by increasing the discovery epoch. For example, as discussed supra, if the UE determines that the overall channel utilization is high, the UE may lower the UE's transmission rate (e.g., LTE-D transmission rate) to reduce overall interference in the system. For example, as discussed supra, if the UE determines that the overall channel utilization is low, the UE may set the discovery epoch to the shortest discovery period of the discovery periods of the available tx pools, in order to allow the UE to transmit more codes.

At 1010, the UE continues to perform additional features as discussed infra.

Figure 11:
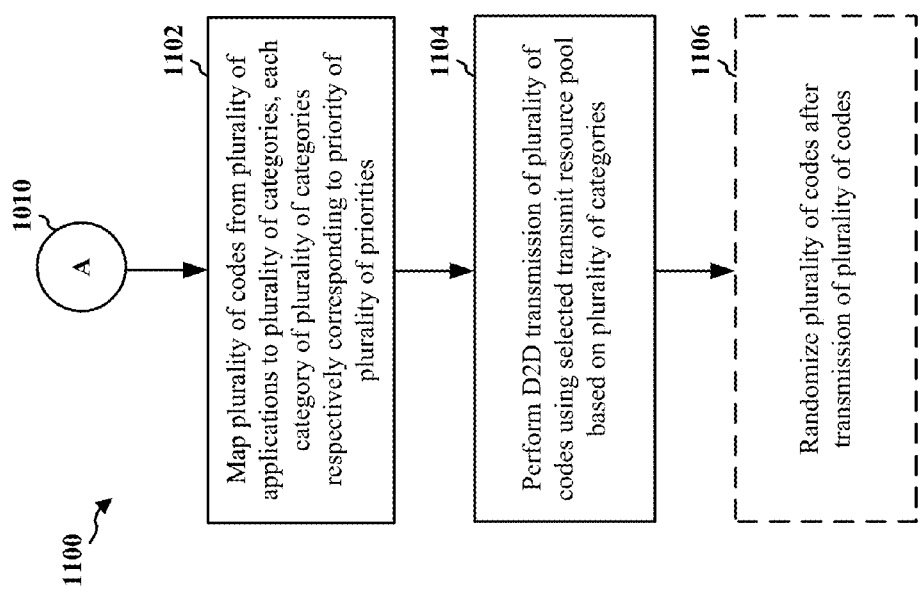
FIG. 11 is a flowchart of a method of device-to-device communication in a licensed spectrum, expanding from the flowchart of FIG. 10.

FIG. 11 is a flowchart 1100 of a method of device-to-device communication in a licensed spectrum, expanding from the flowchart 1000 of FIG. 10. The method may be performed by a UE (e.g., the UE 602, the apparatus 1202/1202'). At 1102, the UE maps a plurality of codes from a plurality of applications to a plurality of categories, each category of the plurality of categories respectively corresponding to a priority of a plurality of priorities. For example, as discussed supra, after assigning weights to the codes, the UE may map the codes to category queues based on the priorities associated with the codes and/or the applications, where different category queues have different que priorities. At 1104, the UE performs the D2D transmission of the plurality of codes using the selected transmit resource pool based on the plurality of categories. For example, as discussed supra, the UE may transmit the codes per discovery period (e.g., discover epoch), using a subframe of a tx pool selected based on channel utilizations. In an aspect, the plurality of priorities are determined based on at least one of a user input to define a priority, a type of an application, a type of a code, or a channel condition affecting an application. For example, as discussed supra, priorities of codes and/or applications may be determined based various factors, such as a user input, application type (e.g., premium application v. non-premium application, foreground application v. non-foreground app), code type (e.g., premium code (paying) v. non-premium code), channel conditions (e.g., where channel conditions may impair one application more than other applications), etc.

In an aspect, the UE performs the D2D transmission of the plurality of codes by: assigning a respective weight of a plurality of weights to each category of the plurality of categories based on the plurality of priorities, allocating a respective portion of portions of available resources within the selected transmit resource pool to each category of the plurality of categories based on the respective weight of the plurality of weights, and transmitting the plurality of codes based on the plurality of categories and the portions of available resources allocated to the plurality of categories. In such an aspect, the UE performs the D2D transmission of the plurality of codes further by: allocating portions of a maximum number of codes that can be transmitted per discovery epoch to the plurality of categories, respectively, based on the plurality of weights. For example, as discussed supra, the UE may configure a minimum percentage of resource allocation for each category, and may assign a weight to each category based on the minimum percentage. For example, as discussed supra, if K codes may be transmitted in a discovery period, a number of codes scheduled for each category may be obtained by multiplying a weight corresponding to a category by K.

In an aspect, the UE performs the D2D transmission of the plurality of codes further by: for each category, if an allocated portion of the maximum number of codes is greater than a number of mapped codes, allocating a difference between the allocated portion of the maximum number of codes and the number of mapped codes to another category having a lower priority. For example, as discussed supra, in the example where the number of codes scheduled for Category 1 is 0.5*K, if Category 1 has N codes and N is less than 0.5*K codes scheduled for Category 1, then the UE may allocate the remaining resources for (0.5*K−N) codes to the next category, Category 2. In an aspect, the UE performs the D2D transmission of the plurality of codes further by: for each category, if an allocated portion of the maximum number of codes is less than or equal to a number of mapped codes, transmitting one or more of the mapped codes during the discovery epoch and scheduling to transmit remaining mapped codes in a subsequent discovery epoch. For example, as discussed supra, per each category, if a number of the codes to be transmitted is greater than a number of codes scheduled for the category (e.g., if N>K), then the UE may transmit up to the scheduled number of codes during a current discovery epoch and may transmit the remaining untransmitted codes (e.g., (N−K) codes) in a next discovery epoch.

At 1106, the UE may randomize the plurality of codes after transmission of the plurality of codes. For example, as discussed supra, after a transmission of the codes, the codes may be randomized before the next discovery epoch such that codes belonging to all categories would be transmitted at least once. In an aspect, within each category, any codes that have not been transmitted previously have a higher priority than codes that have been transmitted previously. For example, as discussed supra, a code that has not been previously transmitted may be assigned a higher priority than a code that has been previously transmitted.

Figure 12:
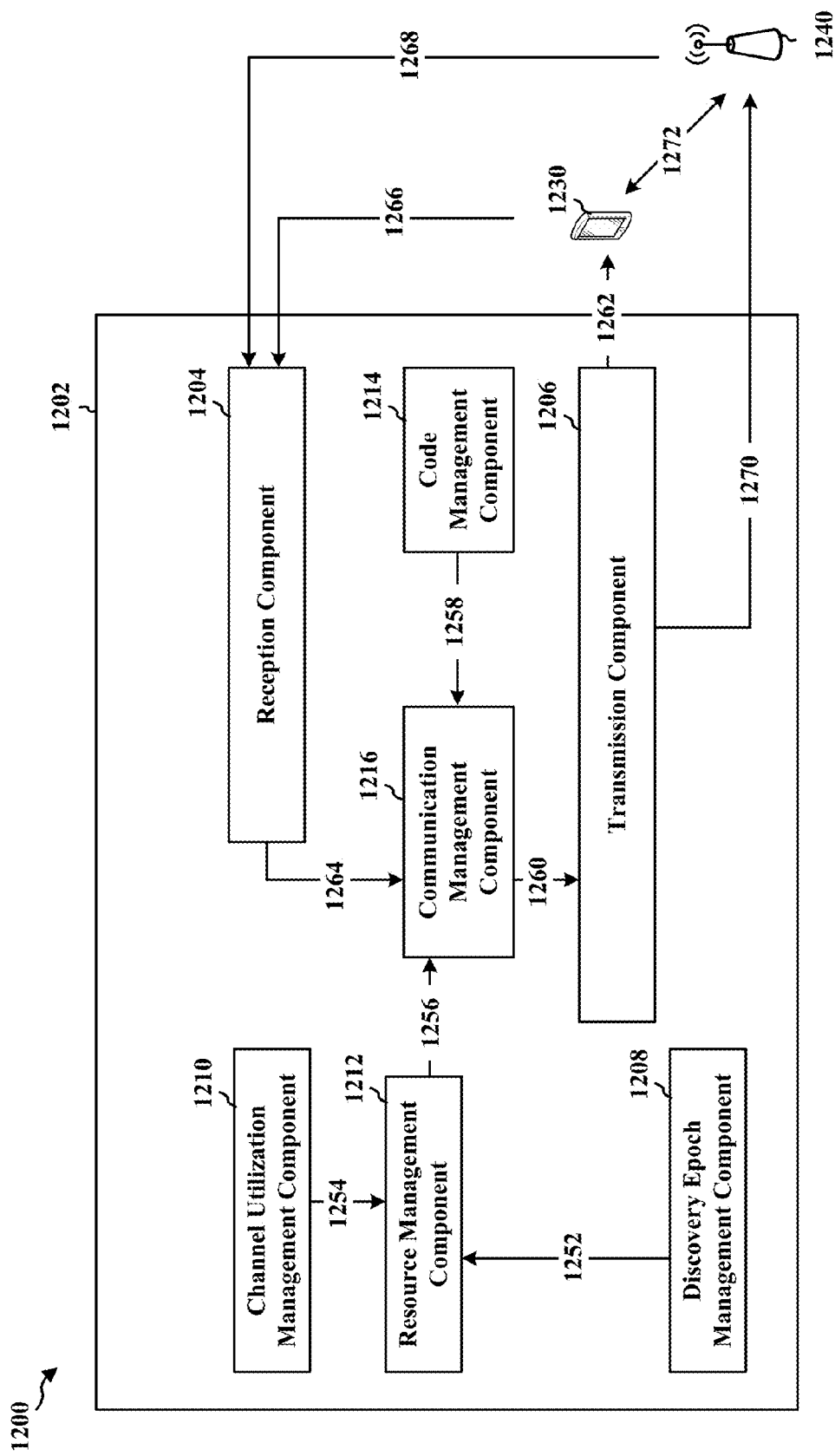
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE. The apparatus includes a reception component 1204, a transmission component 1206, a discovery epoch management component 1208, a channel utilization management component 1210, a resource management component 1212, a code management component 1214, and a communication management component 1216.

The discovery epoch management component 1208 sets a discovery epoch to a shortest discovery period among discovery periods of a plurality of transmit resource pools, each transmit resource pool of the plurality of transmit resource pools associated with a respective frequency. The discovery epoch management component 1208 may forward information about the discovery epoch to the resource management component 1212. The channel utilization management component 1210 estimates a channel utilization of each transmit resource pool of the plurality of transmit resource pools based on one or more previous transmissions on each transmit resource pool of the plurality of transmit resource pools. The channel utilization management component 1210 may forward information about the channel utilizations to the resource management component 1212 at 1254. The resource management component 1212 selects a transmit resource pool among the plurality of transmit resource pools for a D2D transmission within the discovery epoch based on the estimated channel utilizations. The resource management component 1212 may forward information about the transmit resource pool to the communication management component 1216, at 1256.

The discovery epoch management component 1208 may adjust a transmission rate based on the estimated channel utilizations of one or more transmit resource pools of the plurality of transmit resource pools. In an aspect, the discovery epoch management component 1208 may adjust the transmission rate by: decreasing the transmission rate if an overall channel utilization based on the estimated channel utilizations of the one or more of the plurality of transmit resource pools is greater than a channel utilization threshold, and increasing the transmission rate if an overall channel utilization based on the estimated channel utilizations of the one or more of the plurality of transmit resource pools is less than or equal to the channel utilization threshold. In an aspect, the transmission rate is adjusted by changing the discovery epoch to a new discovery epoch, the new discovery epoch being one of the discovery periods of the plurality of transmit resource pools that is different from the discovery epoch. In an aspect, the channel utilization of each transmit resource pool of the plurality of transmit resource pools is estimated based on at least one of a CRC or an energy level.

The code management component 1214 maps a plurality of codes from a plurality of applications to a plurality of categories, each category of the plurality of categories respectively corresponding to a priority of a plurality of priorities. The code management component 1214 may forward the information about the mapping of the plurality of codes to the communication management component 1216, at 1258. The communication management component 1216 performs, via the transmission component 1206, the D2D transmission of the plurality of codes using the selected transmit resource pool based on the plurality of categories (e.g., to a UE 1230 at 1260 and 1262). In an aspect, the plurality of priorities are determined based on at least one of a user input to define a priority, a type of an application, a type of a code, or a channel condition affecting an application. The communication management component 1216 may also be configured to receive, via the reception component 1204 at 1264, communication from the UE 1230 at 1266. The communication management component 1216 may also be configured to receive, via the reception component 1204, communication from a base station 1240, at 1268 and 1264, and to transmit, via the transmission component 1206, communication to the base station 1240, at 1260 and 1270. The UE 1230 and the base station 1240 may communicate with each other at 1272.

In an aspect, the communication management component 1216 performs the D2D transmission of the plurality of codes by: assigning a respective weight of a plurality of weights to each category of the plurality of categories based on the plurality of priorities, allocating a respective portion of portions of available resources within the selected transmit resource pool to each category of the plurality of categories based on the respective weight of the plurality of weights, and transmitting the plurality of codes based on the plurality of categories and the portions of available resources allocated to the plurality of categories. In such an aspect, the communication management component 1216 performs the D2D transmission of the plurality of codes further by: allocating portions of a maximum number of codes that can be transmitted per discovery epoch to the plurality of categories, respectively, based on the plurality of weights. In such an aspect, the communication management component 1216 performs the D2D transmission of the plurality of codes further by: for each category, if an allocated portion of the maximum number of codes is greater than a number of mapped codes, allocating a difference between the allocated portion of the maximum number of codes and the number of mapped codes to another category having a lower priority. In such an aspect, the communication management component 1216 performs the D2D transmission of the plurality of codes further by: for each category, if an allocated portion of the maximum number of codes is less than or equal to a number of mapped codes, transmitting one or more of the mapped codes during the discovery epoch and scheduling to transmit remaining mapped codes in a subsequent discovery epoch.

The code management component 1214 may randomize the plurality of codes after transmission of the plurality of codes. In an aspect, within each category, any codes that have not been transmitted previously have a higher priority than codes that have been transmitted previously.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
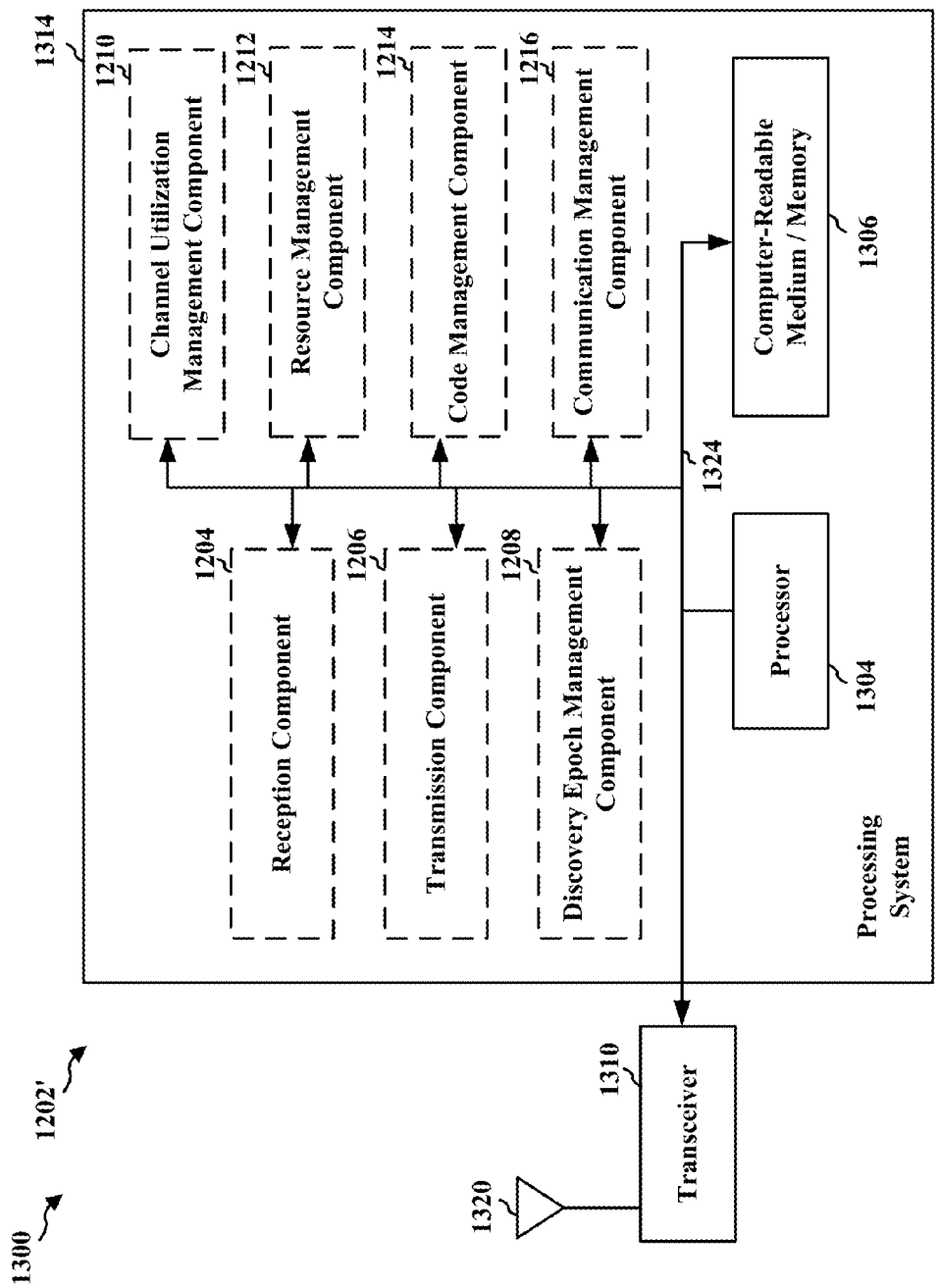
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for D2D communication in a licensed spectrum includes means for setting a discovery epoch to a shortest discovery period among discovery periods of a plurality of transmit resource pools, each transmit resource pool of the plurality of transmit resource pools associated with a respective frequency, means for estimating a channel utilization of each transmit resource pool of the plurality of transmit resource pools based on one or more previous transmissions on each transmit resource pool of the plurality of transmit resource pools, and means for selecting a transmit resource pool among the plurality of transmit resource pools for a D2D transmission within the discovery epoch based on the estimated channel utilizations. In an aspect, the apparatus 1202/1202' further includes means for adjusting a transmission rate based on the estimated channel utilizations of one or more transmit resource pools of the plurality of transmit resource pools. In an aspect, the means for adjusting the transmission rate is configured to: decrease the transmission rate if an overall channel utilization based on the estimated channel utilizations of the one or more of the plurality of transmit resource pools is greater than a channel utilization threshold, and increase the transmission rate if an overall channel utilization based on the estimated channel utilizations of the one or more of the plurality of transmit resource pools is less than or equal to the channel utilization threshold.

In an aspect, the apparatus 1202/1202' further includes means for mapping a plurality of codes from a plurality of applications to a plurality of categories, each category of the plurality of categories respectively corresponding to a priority of a plurality of priorities, and means for performing the D2D transmission of the plurality of codes using the selected transmit resource pool based on the plurality of categories. In an aspect, the means for performing the D2D transmission of the plurality of codes is configured to: assign a respective weight of a plurality of weights to each category of the plurality of categories based on the plurality of priorities, allocate a respective portion of portions of available resources within the selected transmit resource pool to each category of the plurality of categories based on the respective weight of the plurality of weights, and transmit the plurality of codes based on the plurality of categories and the portions of available resources allocated to the plurality of categories. In an aspect, the means for performing the D2D transmission of the plurality of codes is further configured to: allocate portions of a maximum number of codes that can be transmitted per discovery epoch to the plurality of categories, respectively, based on the plurality of weights. In an aspect, the means for performing the D2D transmission of the plurality of codes is further configured to: for each category, if an allocated portion of the maximum number of codes is greater than a number of mapped codes, allocate a difference between the allocated portion of the maximum number of codes and the number of mapped codes to another category having a lower priority. In an aspect, the means for performing the D2D transmission of the plurality of codes further configured to: for each category, if an allocated portion of the maximum number of codes is less than or equal to a number of mapped codes, transmit one or more of the mapped codes during the discovery epoch and scheduling to transmit remaining mapped codes in a subsequent discovery epoch. In an aspect, the apparatus 1202/1202' further includes means for randomizing the plurality of codes after transmission of the plurality of codes.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of device-to-device (D2D) communication in a licensed spectrum, comprising:
    setting a discovery epoch to a shortest discovery period among discovery periods of a plurality of transmit resource pools, each transmit resource pool of the plurality of transmit resource pools associated with a respective frequency;
    estimating a channel utilization of each transmit resource pool of the plurality of transmit resource pools based on at least one of a cyclic redundancy check (CRC) or an energy level associated with one or more previous transmissions on each transmit resource pool of the plurality of transmit resource pools;
    selecting a transmit resource pool among the plurality of transmit resource pools for a D2D transmission within the discovery epoch based on the estimated channel utilizations; and
    performing the D2D transmission with another device using the selected transmit resource pool.

2. The method of claim 1, further comprising:
    adjusting a transmission rate based on the estimated channel utilizations of one or more transmit resource pools of the plurality of transmit resource pools.

3. The method of claim 2, wherein the adjusting the transmission rate comprises:
    decreasing the transmission rate if an overall channel utilization based on the estimated channel utilizations of the one or more of the plurality of transmit resource pools is greater than a channel utilization threshold; and
    increasing the transmission rate if an overall channel utilization based on the estimated channel utilizations of the one or more of the plurality of transmit resource pools is less than or equal to the channel utilization threshold.

4. The method of claim 2, wherein the transmission rate is adjusted by changing the discovery epoch to a new discovery epoch, the new discovery epoch being one of the discovery periods of the plurality of transmit resource pools that is different from the discovery epoch.

5. The method of claim 1, further comprising:
    mapping a plurality of codes from a plurality of applications to a plurality of categories, each category of the plurality of categories respectively corresponding to a priority of a plurality of priorities; and
    performing the D2D transmission of the plurality of codes using the selected transmit resource pool based on the plurality of categories.

6. The method of claim 5, wherein the plurality of priorities are determined based on at least one of a user input to define a priority, a type of an application, a type of a code, or a channel condition affecting an application.

7. The method of claim 5, wherein the performing the D2D transmission of the plurality of codes comprises:
assigning a respective weight of a plurality of weights to each category of the plurality of categories based on the plurality of priorities;
allocating a respective portion of portions of available resources within the selected transmit resource pool to each category of the plurality of categories based on the respective weight of the plurality of weights; and
transmitting the plurality of codes based on the plurality of categories and the portions of available resources allocated to the plurality of categories.

8. The method of claim 7, wherein the performing the D2D transmission of the plurality of codes further comprises:
allocating portions of a maximum number of codes that can be transmitted per discovery epoch to the plurality of categories, respectively, based on the plurality of weights.

9. The method of claim 8, wherein the performing the D2D transmission of the plurality of codes further comprises:
for each category, if an allocated portion of the maximum number of codes is greater than a number of mapped codes, allocating a difference between the allocated portion of the maximum number of codes and the number of mapped codes to another category having a lower priority.

10. The method of claim 8, wherein the performing the D2D transmission of the plurality of codes further comprises:
for each category, if an allocated portion of the maximum number of codes is less than or equal to a number of mapped codes, transmitting one or more of the mapped codes during the discovery epoch and scheduling to transmit remaining mapped codes in a subsequent discovery epoch.

11. The method of claim 5, further comprising:
randomizing the plurality of codes after transmission of the plurality of codes.

12. The method of claim 5, wherein, within each category, any codes that have not been transmitted previously have a higher priority than codes that have been transmitted previously.

13. An apparatus for device-to-device (D2D) communication in a licensed spectrum, comprising:
means for setting a discovery epoch to a shortest discovery period among discovery periods of a plurality of transmit resource pools, each transmit resource pool of the plurality of transmit resource pools associated with a respective frequency;
means for estimating a channel utilization of each transmit resource pool of the plurality of transmit resource pools based on at least one of a cyclic redundancy check (CRC) or an energy level associated with one or more previous transmissions on each transmit resource pool of the plurality of transmit resource pools;
means for selecting a transmit resource pool among the plurality of transmit resource pools for a D2D transmission within the discovery epoch based on the estimated channel utilizations; and
a transmission component configured to perform the D2D transmission with another device using the selected transmit resource pool.

14. The apparatus of claim 13, further comprising:
means for adjusting a transmission rate based on the estimated channel utilizations of one or more transmit resource pools of the plurality of transmit resource pools.

15. The apparatus of claim 14, wherein the means for adjusting the transmission rate is configured to:
decrease the transmission rate if an overall channel utilization based on the estimated channel utilizations of the one or more of the plurality of transmit resource pools is greater than a channel utilization threshold; and
increase the transmission rate if an overall channel utilization based on the estimated channel utilizations of the one or more of the plurality of transmit resource pools is less than or equal to the channel utilization threshold.

16. The apparatus of claim 14, wherein the transmission rate is adjusted by changing the discovery epoch to a new discovery epoch, the new discovery epoch being one of the discovery periods of the plurality of transmit resource pools that is different from the discovery epoch.

17. The apparatus of claim 13, further comprising:
means for mapping a plurality of codes from a plurality of applications to a plurality of categories, each category of the plurality of categories respectively corresponding to a priority of a plurality of priorities; and
means for performing the D2D transmission of the plurality of codes using the selected transmit resource pool based on the plurality of categories.

18. The apparatus of claim 17, wherein the plurality of priorities are determined based on at least one of a user input to define a priority, a type of an application, a type of a code, or a channel condition affecting an application.

19. The apparatus of claim 17, wherein the means for performing the D2D transmission of the plurality of codes is configured to:
assign a respective weight of a plurality of weights to each category of the plurality of categories based on the plurality of priorities;
allocate a respective portion of portions of available resources within the selected transmit resource pool to each category of the plurality of categories based on the respective weight of the plurality of weights; and
transmit the plurality of codes based on the plurality of categories and the portions of available resources allocated to the plurality of categories.

20. The apparatus of claim 19, wherein the means for performing the D2D transmission of the plurality of codes is further configured to:
allocate portions of a maximum number of codes that can be transmitted per discovery epoch to the plurality of categories, respectively, based on the plurality of weights.

21. The apparatus of claim 20, wherein the means for performing the D2D transmission of the plurality of codes is further configured to:
for each category, if an allocated portion of the maximum number of codes is greater than a number of mapped codes, allocate a difference between the allocated portion of the maximum number of codes and the number of mapped codes to another category having a lower priority.

22. The apparatus of claim 20, wherein the means for performing the D2D transmission of the plurality of codes further configured to:
for each category, if an allocated portion of the maximum number of codes is less than or equal to a number of mapped codes, transmit one or more of the mapped codes during the discovery epoch and scheduling to transmit remaining mapped codes in a subsequent discovery epoch.

23. The apparatus of claim 17, further comprising:
means for randomizing the plurality of codes after transmission of the plurality of codes.

24. The apparatus of claim 17, wherein, within each category, any codes that have not been transmitted previously have a higher priority than codes that have been transmitted previously.

25. An apparatus for device-to-device (D2D) communication in a licensed spectrum, comprising:
a memory;
at least one processor coupled to the memory and configured to:
set a discovery epoch to a shortest discovery period among discovery periods of a plurality of transmit resource pools, each transmit resource pool of the plurality of transmit resource pools associated with a respective frequency;
estimate a channel utilization of each transmit resource pool of the plurality of transmit resource pools based on at least one of a cyclic redundancy check (CRC) or an energy level associated with one or more previous transmissions on each transmit resource pool of the plurality of transmit resource pools; and
select a transmit resource pool among the plurality of transmit resource pools for a D2D transmission within the discovery epoch based on the estimated channel utilizations; and
a transmission component coupled to the at least one processor and configured to perform the D2D transmission with another device using the selected transmit resource pool.

26. The apparatus of claim 25, wherein the at least one processor is configured to:
adjust a transmission rate based on the estimated channel utilizations of one or more transmit resource pools of the plurality of transmit resource pools.

27. The apparatus of claim 25, wherein the at least one processor is configured to:
map a plurality of codes from a plurality of applications to a plurality of categories, each category of the plurality of categories respectively corresponding to a priority of a plurality of priorities; and
perform the D2D transmission of the plurality of codes using the selected transmit resource pool based on the plurality of categories.

28. A computer-readable medium storing computer executable code, for device-to-device (D2D) communication in a licensed spectrum, comprising code to:
set a discovery epoch to a shortest discovery period among discovery periods of a plurality of transmit resource pools, each transmit resource pool of the plurality of transmit resource pools associated with a respective frequency;
estimate a channel utilization of each transmit resource pool of the plurality of transmit resource pools based on at least one of a cyclic redundancy check (CRC) or an energy level associated with one or more previous transmissions on each transmit resource pool of the plurality of transmit resource pools;
select a transmit resource pool among the plurality of transmit resource pools for a D2D transmission within the discovery epoch based on the estimated channel utilizations; and
perform the D2D transmission with another device using the selected transmit resource pool.

* * * * *